(12) United States Patent
Van Mill et al.

(10) Patent No.: US 10,426,092 B2
(45) Date of Patent: Oct. 1, 2019

(54) DUAL AUGER GRAIN CART WITH ADJUSTABLE FORWARD REACH

(71) Applicant: Unverferth Manufacturing Company, Inc., Kalida, OH (US)

(72) Inventors: Michael D. Van Mill, Shell Rock, IA (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 57 days.

(21) Appl. No.: 15/621,427

(22) Filed: Jun. 13, 2017

(65) Prior Publication Data

US 2017/0290270 A1 Oct. 12, 2017

Related U.S. Application Data

(63) Continuation-in-part of application No. 14/642,449, filed on Mar. 9, 2015, now Pat. No. 9,706,713, which
(Continued)

(51) Int. Cl.
| | | |
|---|---|---|
| *A01D 90/10* | (2006.01) | |
| *B60P 1/42* | (2006.01) | |
| *B65G 41/00* | (2006.01) | |

(52) U.S. Cl.
CPC .............. *A01D 90/10* (2013.01); *B60P 1/42* (2013.01); *B65G 41/002* (2013.01)

(58) Field of Classification Search
CPC ....... A01D 41/1217; A01D 90/10; B60P 1/42; B65G 41/002
(Continued)

(56) References Cited

U.S. PATENT DOCUMENTS

| | | | |
|---|---|---|---|
| 1,867,573 A | * | 7/1932 | Leach ...................... F23K 3/14 198/661 |
| 2,380,840 A | | 7/1945 | Hanna |

(Continued)

OTHER PUBLICATIONS

Unverferth Manufacturing Co., Inc., Brochure "Reach Up. Reach OUT!" 2009.
(Continued)

*Primary Examiner* — James Keenan
(74) *Attorney, Agent, or Firm* — Rothwell, Figg, Ernst & Manbeck, p.c.

(57) ABSTRACT

A cart for transporting and conveying agricultural materials is provided. The cart includes a frame; a set of wheels or tracks coupled with said frame; and a hitch assembly coupled with said frame to allow the cart to be towed on the wheels or tracks behind a tow vehicle. The cart further includes a hopper defined by a plurality of walls supported by the frame and having a hopper opening to receive agricultural material and a discharge opening for discharging agricultural material. The cart further includes a conveyor assembly coupled to the hopper, the conveyor assembly including an inlet in communication with the discharge opening to receive agricultural material therefrom and an outlet to discharge agricultural material. The conveyor assembly includes a lower conveyor section and an upper conveyor section. The lower conveyor section includes a lower conveyor housing and a lower conveyor extending within the lower conveyor housing and the upper conveyor section including an upper conveyor housing and an upper conveyor extending within the upper conveyor housing. The upper conveyor section is pivotable about a second tilt axis located between said lower and upper conveyor sections and positioned at an acute angle from vertical.

24 Claims, 9 Drawing Sheets

Related U.S. Application Data is a continuation-in-part of application No. 14/231,166, filed on Mar. 31, 2014, now Pat. No. 9,723,789, which is a continuation of application No. 13/190,311, filed on Jul. 25, 2011, now Pat. No. 8,702,368.

(60) Provisional application No. 61/982,693, filed on Apr. 22, 2014.

(58) Field of Classification Search
USPC ..... 198/314, 318, 550.1, 661, 668; 414/504, 414/523, 526
See application file for complete search history.

(56) References Cited

U.S. PATENT DOCUMENTS

| | | | |
|---|---|---|---|
| 2,452,249 A * | 10/1948 | Leiske | F26B 17/20 198/548 |
| 2,507,245 A * | 5/1950 | Dady | F23K 3/14 198/661 |
| 3,014,575 A | 12/1961 | Klein | |
| 3,035,662 A | 5/1962 | Ferch | |
| 3,100,052 A | 8/1963 | Brembeck | |
| 3,175,676 A | 3/1965 | Vander Schaaf | |
| 3,198,314 A | 8/1965 | Duram | |
| 3,286,862 A * | 11/1966 | Hansen | A01D 90/10 198/314 |
| 3,391,778 A * | 7/1968 | Lasiter | B60P 1/40 198/530 |
| 3,638,816 A * | 2/1972 | Mann | B65G 41/002 414/504 |
| 3,642,155 A * | 2/1972 | Carlson | B60P 1/36 198/313 |
| 3,773,164 A | 11/1973 | Bradley | |
| 4,015,734 A * | 4/1977 | Laidig | B65G 65/466 198/661 |
| 4,119,223 A | 10/1978 | Flechter | |
| 4,218,169 A | 8/1980 | Arends | |
| 4,386,695 A * | 6/1983 | Olson | B65G 65/466 198/661 |
| 4,411,581 A | 10/1983 | Niewold | |
| 4,923,358 A | 5/1990 | Van Mill | |
| 4,989,716 A | 2/1991 | Stuckey | |
| 5,122,263 A * | 6/1992 | Huber | B01D 29/118 414/218 |
| 5,409,344 A | 4/1995 | Tharaldson | |
| 5,443,352 A * | 8/1995 | Schuhmacher | A01D 41/1208 198/550.01 |
| 5,516,253 A | 5/1996 | Linscheid | |
| 5,538,388 A | 7/1996 | Bergkamp et al. | |
| 5,655,872 A | 8/1997 | Plotkin | |
| 5,733,094 A | 3/1998 | Bergkamp et al. | |
| 5,788,055 A | 8/1998 | Stewart et al. | |
| 5,980,189 A | 11/1999 | Rubner | |
| 6,017,182 A | 1/2000 | Grieshop | |
| 6,042,326 A | 3/2000 | Thomas et al. | |
| 6,113,339 A | 9/2000 | Adams | |
| 6,209,880 B1 | 4/2001 | Turnwald et al. | |
| 6,497,546 B2 | 12/2002 | Wood et al. | |
| 6,767,174 B2 | 7/2004 | Cresswell | |
| 6,893,202 B2 | 5/2005 | Hunt | |
| 7,381,131 B1 | 6/2008 | Harpole | |
| 7,393,275 B2 | 7/2008 | Voss et al. | |
| 7,690,499 B2 | 4/2010 | Smith et al. | |
| 8,328,497 B2 | 12/2012 | Wood | |
| 9,061,834 B2 | 6/2015 | Mulder et al. | |
| 9,090,198 B2 | 7/2015 | Engle | |
| 9,102,478 B2 * | 8/2015 | Van Mill | B60P 1/42 |
| 9,137,945 B2 | 9/2015 | Farley | |
| 2006/0018742 A1 | 1/2006 | Hook | |
| 2009/0123262 A1 | 5/2009 | Van Mill et al. | |
| 2010/0009731 A1 | 1/2010 | Coers | |
| 2010/0209223 A1 | 8/2010 | Van Mill et al. | |
| 2010/0254792 A1 | 10/2010 | Kinzenbaw | |
| 2013/0259615 A1 | 10/2013 | Van Mill et al. | |
| 2014/0090958 A1 | 4/2014 | Mulder | |
| 2017/0000024 A1 * | 1/2017 | Farley | A01D 41/127 |

OTHER PUBLICATIONS

Art's Way Brochure, "Sugar Beet Harvester", 4 pages.
Brent, "Avalanche Grain Cart", 1999, 3 pages.

\* cited by examiner

Fig 4A

SECTION E-E
Fig 4B

DUAL AUGER GRAIN CART WITH ADJUSTABLE FORWARD REACH

CROSS-REFERENCE TO RELATED APPLICATIONS

This application is a continuation-in-part of U.S. patent application Ser. No. 14/642,449, filed on Mar. 9, 2015, which is a continuation-in-part of U.S. patent application Ser. No. 14/231,166, filed on Mar. 31, 2014, which is a continuation of U.S. patent application Ser. No. 13/190,311, filed on Jul. 25, 2011, now U.S. Pat. No. 8,702,368; and claims the benefit of U.S. Provisional Patent Application Ser. No. 61/982,693, filed on Apr. 22, 2014, all of which are incorporated by reference herein in their entirety.

BACKGROUND

Field of the Invention

The present invention is generally directed to carts for transporting agricultural materials and specifically directed to a grain cart with a folding auger having adjustable elevation.

Discussion of the Background Art

Carts, such as grain carts, can be used to shorten harvesting time by improving the efficiency of harvesting equipment such as combines. Such carts can, for example, be used to transport grain from harvesters or combines in the field to grain trucks or bins at the side of the field. Carts are often preferred for use compared to grain bins or grain trucks because grain bins are typically immobile and grain trucks typically do not perform well in muddy or rough field conditions and have the potential to spark fires in dry fields. Carts usually comprise a bin (e.g., a container, hopper, or box) sitting atop a wheeled frame in combination with an auger means or mechanism for unloading grain from the bin. Carts can be designed to handle soft or rough fields with ease and can be designed to be drawn by a tractor alongside a combine that unloads its contents into the cart. Carts can be used to enable a combine to continue to harvest while unloading the grain into the cart. This grain unloading arrangement can increase productivity dramatically because combines need never stop to unload. In addition, it is not necessary for the combines themselves to travel to grain trucks or bins at the side of the field each time the combine is full. After a cart is loaded with grain or other material by one or more combines, the grain is unloaded from the cart into a bin for temporary storage or into a waiting grain truck for transport to another location, such as a grain elevator. Because carts offer a combination of economy, versatility, production savings, and maneuverability, they have been widely accepted by farmers and widely produced by equipment manufacturers.

Carts capable of unloading grain directly into a grain truck or bin often use a conveyor to do so. Often the conveyor is in the form of an auger. Various auger configurations are known. Auger structures can, for example, be contained inside the hopper structure, located entirely outside of it, or in another desired location. Auger configurations can, for example, have a single auger or multiple augers. The auger structure can, for example, be located at the front, side, back, corner, or another desired location of the cart.

In auger configurations having an auger that extends through the hopper such that there is an auger structure contained inside the hopper structure, grain removal from the hopper can be significantly impaired because internal auger structures can hinder downward grain flow. Therefore, it is often desirable that the auger structure be located entirely outside of the hopper.

A double auger configuration can have, for example, a lower auger and an upper auger. The lower auger can, for example, receive material from the hopper and deposit it into the upper auger. The upper auger can then, for example, carry the material received from the lower auger and deposit it into a trailer, such as a grain trailer. Triple auger configurations are also known, which can include, for example, a lower, horizontally disposed drag auger, a vertically disposed lift auger, and an upper, horizontally disposed discharge auger.

SUMMARY

According to a first aspect, a cart for transporting and conveying agricultural materials is provided. The cart includes a frame; a set of wheels or tracks coupled with the frame; and a hitch assembly coupled with the frame to allow the cart to be towed on the wheels or tracks behind a tow vehicle. The cart further includes a hopper defined by a plurality of walls supported by the frame and having a hopper opening to receive agricultural material and a discharge opening for discharging agricultural material. The cart further includes a conveyor assembly coupled to the hopper, the conveyor assembly including an inlet in communication with the discharge opening to receive agricultural material therefrom and an outlet to discharge agricultural material. The conveyor assembly includes a lower conveyor section and an upper conveyor section. The lower conveyor section includes a lower conveyor housing and a lower conveyor extending within the lower conveyor housing and the upper conveyor section includes an upper conveyor housing and an upper conveyor extending within the upper conveyor housing. The upper conveyor section is pivotable about a second tilt axis located between the lower and upper conveyor sections and positioned at an acute angle from vertical.

In some embodiments, the second tilt axis is at an angle from vertical from about 5° to about 40°. In some embodiments, the cart further includes a tilting assembly coupled to an end of the lower conveyor housing and having a first tilt axis that is generally horizontal, and the tilting assembly is configured to pivot the conveyor assembly about the first tilt axis. In some embodiments, the first tilt axis is parallel to a longitudinal axis of the frame. In some embodiments, the second tilt axis is oriented to allow the upper conveyor section to pivot fore and aft.

In some embodiments, the upper conveyor is connected to the lower conveyor via a universal joint. In some embodiments, the tilting assembly further includes at least one trunnion extending from the upper and lower conveyor housings and at least one bearing assembly on the other housing configured to receive the at least one trunnion. In some embodiments, the tilting assembly further includes a linear actuator having one end connected to the lower conveyor section and another end connected to the upper conveyor section.

In some embodiments, the tilting assembly is configured to allow up to 20° of tilt in either direction relative to an in-line position where longitudinal axes of the upper and lower conveyor sections are in-line. In some embodiments, the conveyor assembly includes a first portion (e.g. first portion 902) having a first set of helical flights (e.g. first helical flights 910) of first diameter (e.g. first diameter 920) and first pitch (e.g. first pitch 922) and a second portion (e.g. second portion 904) having a second set of helical flights (e.g. second helical flights 912) of second diameter (e.g. second diameter 926) and second pitch (e.g. second pitch 924), wherein the first diameter is larger than the second diameter, and wherein the first pitch is larger than the second pitch, and wherein the first portion is in one of the lower conveyor section and the upper conveyor section and the second portion is in one of the lower conveyor section and the upper conveyor section.

In some embodiments, the tilting assembly is configured to allow the upper conveyor section to pivot between a first operating position in which a longitudinal axis of the upper conveyor section is generally collinear with a longitudinal axis of the lower conveyor section and a second operating position in which the longitudinal axis of the upper conveyor section is angled relative to the longitudinal axis of the lower conveyor section. In some embodiments, the longitudinal axis of the upper conveyor section extends upwardly at a first acute angle in a plane generally perpendicular to the longitudinal axis of the hopper in the first operating position and extends forwardly at a second acute angle relative to the first plane in the second operating position. In some embodiments, a height of the discharge outlet in the first and second operating positions is the same; in other embodiments, a height of the discharge outlet in the second operating position is higher than a height of the discharge outlet in the first operating position.

In some embodiments, the second tilt axis is configured such that a discharge height when longitudinal axes of the lower and upper conveyor sections are inline is the lowest height position of the tilt movement, whereby as the upper conveyor section moves forward and rearward through the second tilt axis, the height increases.

In some embodiments, the tilt assembly is configured to be controlled by a control system. In some embodiments, the control system is configured to automatically move the discharge outlet outward about a pivot axis approximately perpendicular to the second tilt axis so that an amount of side reach is maintained. In some embodiments, the control system is configured to automatically move the discharge outlet sideways about an axis in-line with a longitudinal axis of the upper conveyor section so that an amount of side reach is maintained.

In some embodiments, the conveyor assembly further includes an intermediate section, the intermediate conveyor section including an intermediate conveyor housing and an intermediate conveyor extending within the intermediate conveyor housing, and the cart further comprising a folding assembly coupled to an end of the intermediate conveyor housing and having a fold axis, the folding assembly configured to pivot the upper conveyor section about the fold axis between a stored position and an operating position.

According to a second aspect, a cart for transporting and conveying agricultural materials is provided. The cart includes a frame; a set of wheels or tracks coupled with the frame; and a hitch assembly coupled with the frame to allow the cart to be towed on the wheels or tracks behind a tow vehicle. The cart further includes a hopper defined by a plurality of walls supported by the frame and having a hopper opening to receive agricultural material and a discharge opening for discharging agricultural material, the plurality of walls including a front wall. The cart further includes a first conveyor assembly including a conveyor disposed in the hopper and operable to move agricultural material from the hopper towards the discharge opening. The cart further includes a second conveyor assembly disposed forwardly of the front wall, the second conveyor assembly including an inlet in communication with the discharge opening to receive agricultural material therefrom and an outlet to discharge agricultural material, wherein the second conveyor assembly includes a lower conveyor section, an upper conveyor section, and an intermediate conveyor section. The lower conveyor section including a lower conveyor housing and a lower conveyor extending within the lower conveyor housing, the intermediate conveyor section including an intermediate conveyor housing and an intermediate conveyor extending within the intermediate conveyor housing, and the upper conveyor section including an upper conveyor housing and an upper conveyor extending within the upper conveyor housing. The cart further includes a folding assembly coupled to an end of the intermediate conveyor housing and having a fold axis, the folding assembly configured to pivot the upper conveyor section about the fold axis between a stored position and an operating position. The cart further includes a tilting assembly coupled to an end of the intermediate conveyor housing and having a tilt axis, the tilting assembly configured to pivot the upper conveyor section about the tilt axis when the upper conveyor section is in the operating position.

In some embodiments, the fold axis is oriented generally horizontally and parallel to a longitudinal axis of the hopper to allow the upper conveyor section, when the upper conveyor section is in the most rearward operating position, to fold across a front of the hopper. In some embodiments, the intermediate conveyor section includes a first end adjacent the lower conveyor section and a second end adjacent the upper conveyor section, and wherein the fold axis is positioned at the second end of the intermediate conveyor section and the second tilt axis is positioned at the first end of the intermediate conveyor section. In some embodiments, the intermediate conveyor has a first end connected to the lower conveyor and has a second end configured to mate with the upper conveyor when the upper conveyor section is in the operating position and to be detached from the upper conveyor when the upper conveyor section is not in the operating position.

In some embodiments, the intermediate conveyor is connected to the lower conveyor via a universal joint. In some embodiments, the tilting assembly includes at least one trunnion extending from one of the upper and intermediate conveyor housings and at least one bearing assembly on the other housing configured to receive the at least one trunnion. In some embodiments, the tilting assembly includes a linear actuator having one end connected to the lower conveyor section and another end connected to the intermediate conveyor section. In some embodiments, the folding assembly includes a linear actuator having one end connected to the upper conveyor section and another end connected to one of the lower conveyor section, the intermediate conveyor section, and the frame. In some embodiments, the tilt and fold assemblies are configured to be controlled by a control system. In some embodiments, the control system is configured to only move the upper conveyor section to the stored position when the upper conveyor section is in a predefined tilt position. In some embodiments, the control system is configured to automatically move the upper conveyor section to a suitable tilt position before moving the upper conveyor section to the stored position. In some embodiments, the control system is configured to automatically move the discharge outlet outward about a pivot axis approximately perpendicular to the tilt axis so that an amount of side reach is maintained. In some embodiments, the control system is configured to automatically move the discharge outlet sideways about an axis in-line with a longitudinal axis of the upper conveyor section so that an amount of side reach is maintained.

Other features and advantages of embodiments of the invention will become apparent to those of skill in the art upon reviewing the following detailed description of the preferred embodiments and the accompanying drawings.

BRIEF DESCRIPTION OF THE DRAWINGS

The accompanying drawings, which are incorporated herein and form part of the specification, illustrate embodiments and, together with the detailed description, serve to explain the principles of the invention and to enable a person skilled in the art to make and use the invention. In the drawings, like reference numbers are used to indicate identical or functionally similar elements.

DETAILED DESCRIPTION OF THE PREFERRED EMBODIMENTS

While the present invention may be embodied in many different forms, a number of illustrative embodiments are described herein with the understanding that the present disclosure is to be considered as providing examples and not intended to limit the invention to the preferred embodiments described and/or illustrated herein.

Referring now to FIGS. 1-7, a grain cart 100 according to an embodiment of the present invention includes a rolling frame 112 for attachment behind a tow vehicle such as a tractor, a bin 114 mounted on the frame for storing a quantity of grain, and an auger assembly, such as second conveyor assembly 116, for unloading grain from the bin. In the embodiment shown in FIGS. 1 and 2, the frame 112 is supported for rolling movement on a set of wheels 118 with tires. In some embodiments, the frame 112 may be supported for rolling movement on a track system, such as track system 800 (shown in FIG. 8). The frame 112 also includes a hitch 122 that extends forwardly from the frame 112 for attachment to a tractor. In the embodiment shown in FIGS. 1 and 2, the bin 114 includes a front wall 124, a rear wall 126, and right and left side walls 128 and 130 defining a space for storing grain. The grain cart 100 may also include a gate or door near a bottom of the bin 114 that separates the grain storage space from a sump area 132. The grain cart 100 may also include a first conveyor assembly 115 disposed in the sump area 132 for moving agricultural material from the bin to a discharge opening in the front bin wall 124. First conveyor assembly 115 may include a conveyor, such as an auger or flighting, or other suitable conveyor type for a grain cart such as a belt conveyor.

Second conveyor assembly 116 includes a lower conveyor section 134, an upper conveyor section 136, and an intermediate conveyor section 135. The upper conveyor section 136 includes a tubular upper housing and an upper auger (not shown) with helical flights rotatably disposed within the upper housing. The upper conveyor section 136 also includes a discharge spout 140 at a top end of the upper housing. The discharge spout 140 may include a discharge opening 141 which allows agricultural material such as grain to exit from the spout. The lower conveyor section 134 includes a tubular lower housing and a lower auger (not shown) with helical flights rotatably disposed within the lower housing. The lower conveyor section 134 extends upwardly, forwardly, and laterally outwardly from the sump area 132 to connect with a bottom end of the upper conveyor section 136 proximate a front left corner of the bin 114 (e.g., proximate the intersection of the front and left walls of the bin). In an embodiment, intermediate conveyor section 135 is located between upper conveyor section 136 and lower conveyor section 134. The intermediate conveyor section 135 includes a tubular intermediate housing and an intermediate auger (not shown) with helical flights rotatably disposed within the intermediate housing. In some embodiments, the lower conveyor section 134 connects with a bottom end of the intermediate conveyor section 135 and the upper conveyor section 134 connects with a top end of the intermediate conveyor section 135. In some embodiments, the lower and intermediate sections are connected by a joint, such as, for example, a universal joint 508.

In embodiments, second conveyor assembly 116 is in communication with sump 132. In some embodiments, the lower conveyor section 134 of the second conveyor assembly is in communication with sump 132 via the first conveyor assembly 115.

The upper and lower conveyor sections are connected by a hinge assembly that defines a pivot axis about which the upper auger section 136 can be pivoted between an operating position and a transport position. In an embodiment, folding of the upper auger section 136 can be effectuated by a fold actuator 604 connected between the upper auger section and the lower auger section, the frame 112, and/or the bin 114. In the embodiment shown, the fold actuator 604 is a hydraulic cylinder connected between the upper and intermediate auger sections 136 and 135. In the operating position, shown in FIGS. 1 and 2, the bottom end of the upper housing abuts a top end of the intermediate housing so that the upper auger section 136 extends upwardly from the intermediate auger section 135 and grain can be conveyed from the sump 132 to the discharge spout 140 via rotation of the augers. In the transport position, the upper auger section 136 is folded relative to the lower auger section 134 so that the upper auger section extends along a wall of the bin 114, e.g., such that the upper auger portion extends rearwardly from the lower auger portion along a side of the bin for easier transport and storage. In an embodiment, the fold axis is oriented generally horizontally and parallel to a longitudinal axis of the bin to allow the upper conveyor section to fold across a front of the bin.

Figure 1:
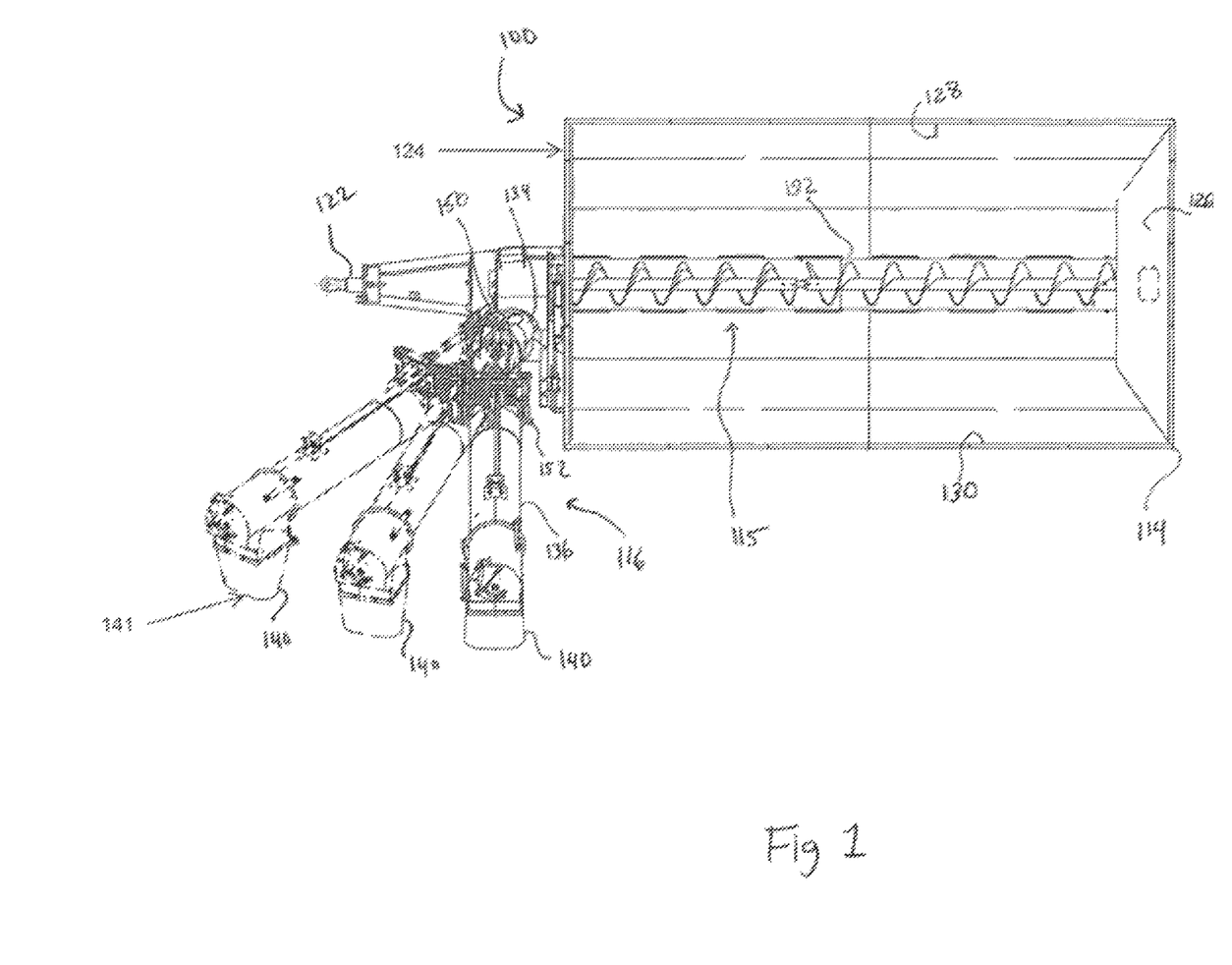
FIG. 1 is a top view of an embodiment of a cart with an upper auger section having adjustable forward reach.
Figure 2:
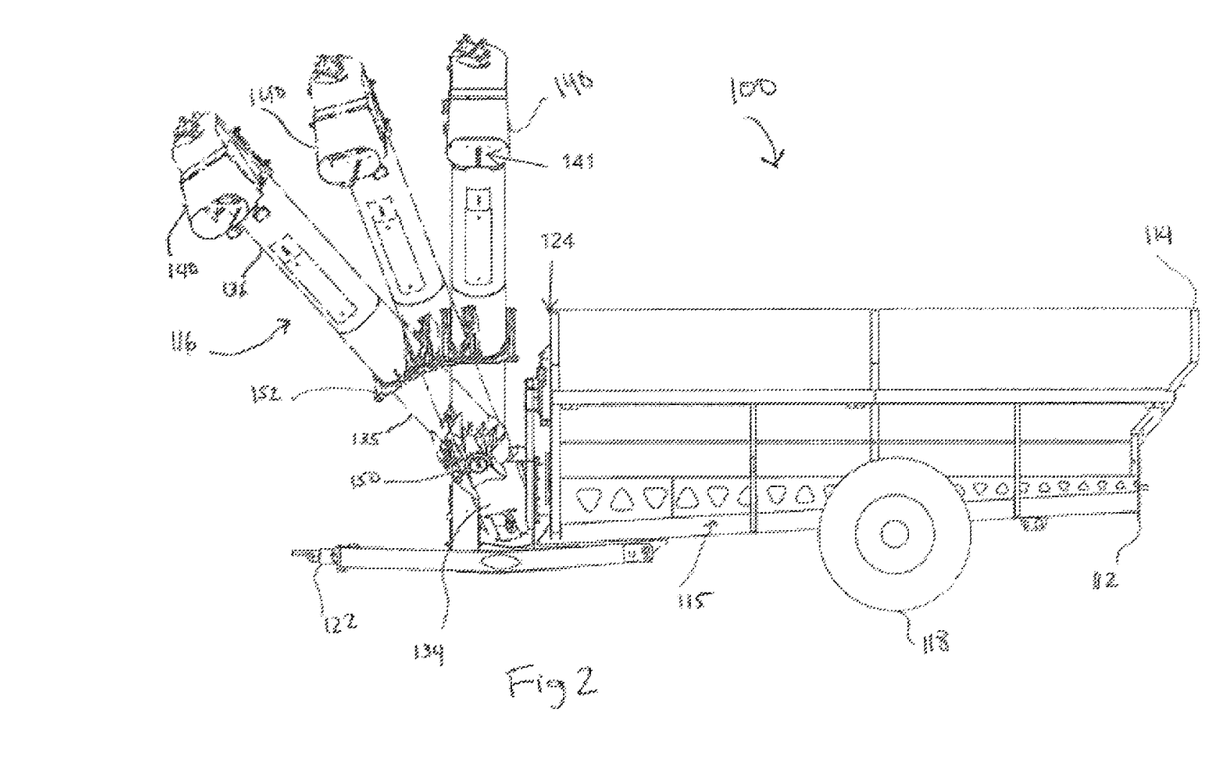
FIG. 2 is a side view of an embodiment of a cart with an upper auger section having adjustable forward reach.
Figure 3:
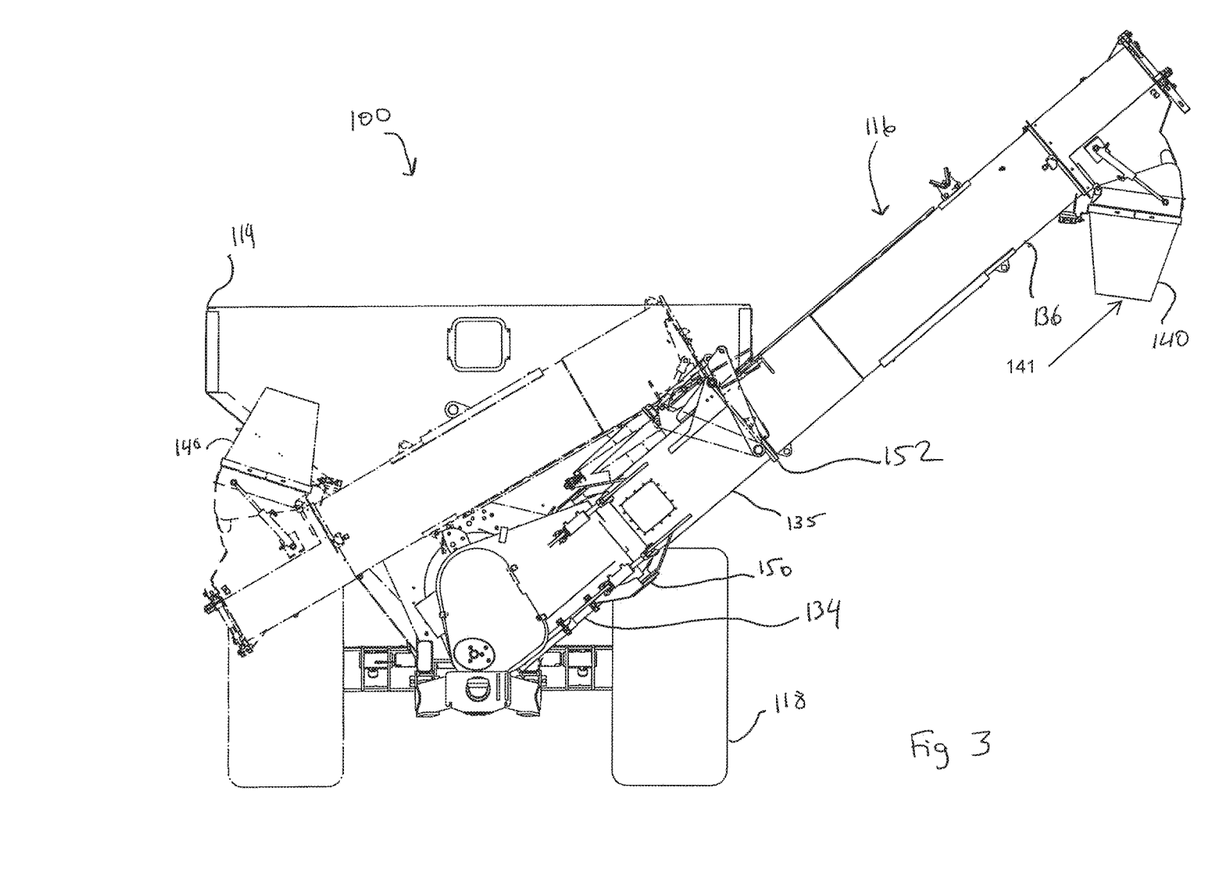
FIG. 3 is a front view of an embodiment of a cart with an upper auger section having adjustable forward reach.
Figure 7:
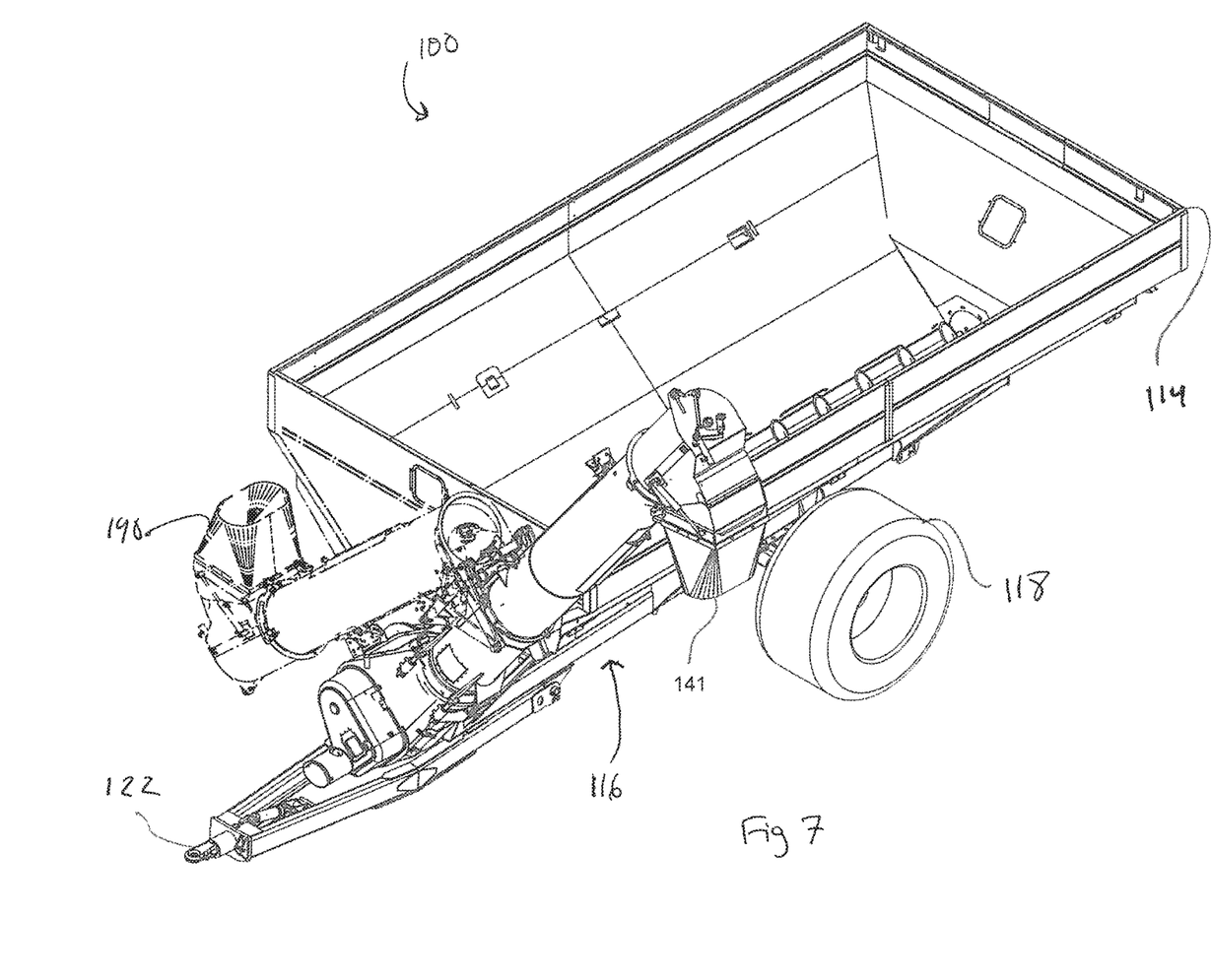
FIG. 7 is a perspective view of an embodiment of a cart with an upper auger section having adjustable forward reach.
Figure 8:
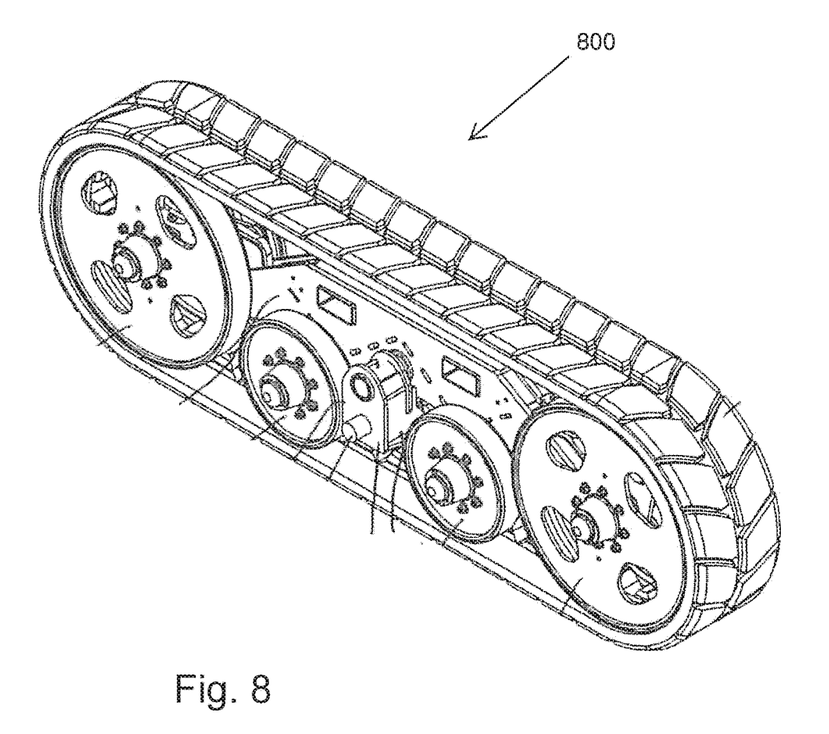
FIG. 8 is a perspective view of a track system.
Figure 9:
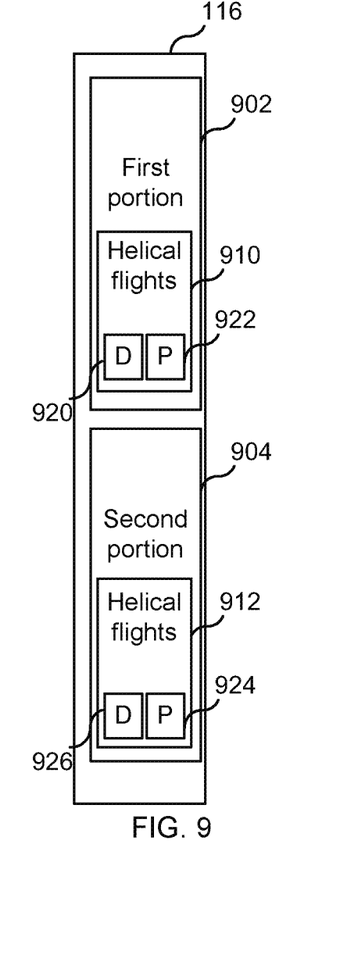
FIG. 9 is a schematic drawing of a grain cart comprising a second conveyor assembly having a first portion having a first set of helical flights of first diameter and first pitch and a second portion having a second set of helical flights of second diameter and second pitch, wherein said first diameter is larger than said second diameter, and wherein said first pitch is larger than said second pitch.

The figures show the different positions that the second conveyor assembly 116 may assume. For example, FIGS. 1 and 2 each show the second conveyor assembly in one of three different operating positions, described herein. These three different operating positions are exemplary of the range of motion, and other operating positions are possible. FIGS. 3 and 7 each show the second conveyor assembly 116 in both an operating position and a storage position. One of ordinary skill in the art will appreciate that the second conveyor assembly 116 is in one position at any one time, and that the figures are for illustrative purposes.

As described in detail below, second conveyor assembly 116 includes a lower conveyor section 134, an upper conveyor section 136 with a discharge end or spout 140, and an intermediate conveyor section or housing 135 coupled between the upper and lower conveyor sections. Also described further herein are a tilting assembly 150, and a folding assembly 152. As described further herein, second conveyor assembly 116 is designed to allow upper conveyor section 136 and intermediate conveyor section 135 to tilt with respect to lower conveyor section 134 via tilting assembly 150 such that a position of discharge end relative to the frame can be adjusted (e.g., to increase the forward position or reach of the conveyor assembly). Additionally, a height of discharge end 140 can be adjusted to correspond to a trailer, truck, bin, or other receptacle. Second conveyor assembly 116 can be pivoted between a lowered and elevated position, and any position in between. In some embodiments, an operator is not limited to choosing solely between these two positions, but may also choose any position between an elevated position and a lowered position. It is appreciated that adjusting the height of discharge end 140 of second conveyor assembly 116 enables the height of discharge end 140 to more closely match a height of a trailer into which material from bin 114 is to be unloaded. Accordingly, a gap between discharge end 140 and the trailer is minimized, thereby minimizing loss of material from bin 114 due to wind during unloading. Moreover, the adjustable elevation makes it easier for operators to position the chute over the trailer. For example, the position (e.g., forward position or reach of the conveyor assembly) may be adjusted to increase operator visibility. Such adjustments also may lessen the amount that the tractor and cart have to move during the unload operating by allowing the discharge spout to move fore and aft (relative to the cart frame) to cover a larger range of trailer hopper length. It is appreciated that second conveyor assembly 116 may be configured to be controlled via a controller disposed on cart 100, or can be controlled by a control system (e.g. remotely from a cab of the tractor or other suitable location).

In one embodiment, the elevation of discharge end 140 of second conveyor assembly 116 may be adjusted from about 126 inches in a lowered position to about 161 inches in an elevated position. This range of heights is suitable to load most common trailers. The taller height is suitable for loading a tall trailer known as a Super B trailer, and the shorter height is suitable for loading a short trailer known a standard North American trailer. By more closely matching the height of the discharge end 140 to the height of the trailer, any gap between them is minimized thereby minimizing grain loss due to wind during the unloading process.

As further described herein, second conveyor assembly 116 is designed to allow upper conveyor section 136 to fold with respect to lower conveyor section 134 and intermediate conveyor section 135 via folding assembly 152 at a folding joint 602 such that upper conveyor section can be folded back against a front or side of cart 100 while in storage, transport, or in other situations. For example, FIG. 3 shows the second conveyor assembly 116 in both folded and unfolded positions. The various components of second conveyor assembly 116 will be described in further detail below.

Lower conveyor section 134 has a lower or bottom end in communication with sump 132 and an upper or top end configured to couple with intermediate section 135. In an embodiment, the lower conveyor section 134 is a tubular member of cylindrical configuration. A lower conveyor is movably (e.g., rotatably) disposed with lower conveyor section 134 to convey material, such as grain, from sump 132 to upper conveyor section 136. The lower conveyor can be in the form of a rotatable auger or, in some embodiments, can be in the form of another suitable conveyor type for a grain cart, such as a suitable belt conveyor.

Figure 4A:
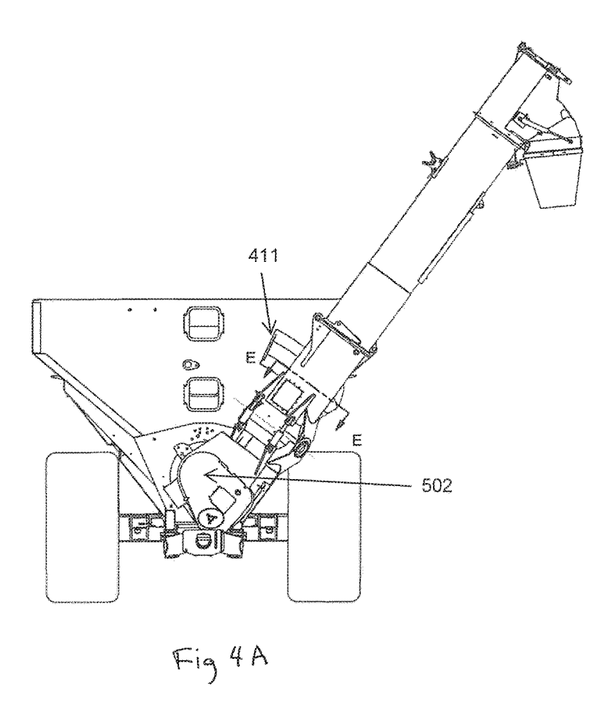
FIG. 4A is a front view of an embodiment of a cart with an upper auger section having adjustable forward reach.
Figure 4B:
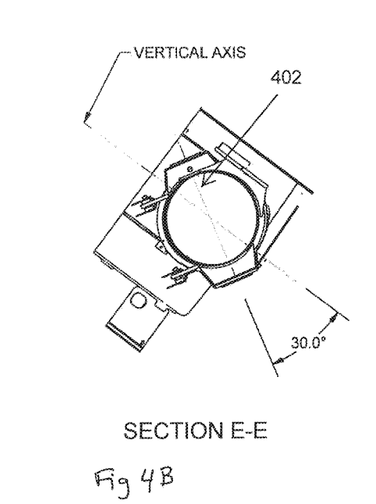
FIG. 4B is a section view along line E-E in FIG. 4A.

In an embodiment, second conveyor assembly 116 is pivotable about tilt axes 402 and 502. For example, in one embodiment, the tilt axis 402 can be positioned at an angle from vertical from 5° to 40°, for example, the tilt axis 402 may be 15° or 30° from vertical. FIG. 4B, which shows a section view along line E-E of FIG. 4A, illustrates a tilt axis 402 having a 30° orientation from vertical. In this embodiment, upper and intermediate conveyor sections tilt relative to the lower conveyor section.

Tilting assembly 150, described below, may be configured to allow tilting about tilt axis 502 by a tilt angle of up to ±35°, or more preferably of up to ±20°. A negative angle indicates a rearward direction. For example, tilting assembly 150 may allow tilting by a forward tilt angle from 0° to 10° to 20° (in a forward direction), and from 0° to −10° to −20° (in a rearward direction). In some embodiments, slide coupling 411 (see FIGS. 4A, 5A) facilitates the tilting assembly allowing tilting of the second conveyor assembly 116 about the tilt axis 502, by permitting second conveyor assembly 116 to slide along the a wall of the bin.

In some embodiments, the tilt axis 402 is configured to such that the height of the discharge end of the upper conveyor section is at the lowest height position of the tilt movement when the upper and lower conveyor sections are inline to each other, so that the height of the discharge end increases during the tilt movement. In some embodiments this feature can be achieved by orienting the tilt axis 402 away from vertical in a direction such that the top of the tilt pivot is away from the upper conveyor tilt direction. In this case the top of the tilt pivot will be toward the bin 114. To get a forward reach movement range that does not decrease the discharge height from when the upper and intermediate conveyor sections are in-line with the lower conveyor section, the angle is equal or greater to the amount of forward tilt angle. So in the case of tilting forward 20°, the tilt axis 402 off of vertical is at least 20°. This causes the discharge end to arch upward as it moves forward. If the tilt axis 402 is half of the total forward tilt angle, then the discharge end of the upper conveyor section will arch upward until a middle tilt angle. The second half of the tilt angle will then bring the discharge end downward. And the start and finished discharge height at the extreme ends of the tilt movement will be the same height.

As used in this application, conveyor sections being in-line with each other refers to their longitudinal axes being substantially in-line. For example, the upper and intermediate conveyor sections are in-line means that the upper and intermediate conveyor sections are positioned such that their longitudinal axes are substantially in-line.

In some embodiments, the lower conveyor section 134 is angled toward the hitch 122. This is different from the configuration where the base of the lower conveyor section moves parallel to the front container wall. By having the lower conveyor section angled about half of the total forward tilt angle movement (e.g., total forward universal joint angle movement), this allows the second conveyor assembly to move at a greater total forward distance given, for example, the same universal joint angle limitation. For example, if the limit on the universal joint is 20°, the lower conveyor section would be angled forward 20 degrees. The intermediate and upper conveyor sections would move forward toward the hitch 20° as well as backwards 20° thereby providing a wider tilt movement range as well as getting the discharge end closer to the hitch. In some embodiments, a second universal joint may be used between the gearbox and the first fighting screw section.

Intermediate section 135 is coupled to both upper conveyor section 136 and lower conveyor section 134 and is designed to allow upper conveyor section 136 and intermediate conveyor section 135 to securely tilt relative to lower conveyor section 134 without spilling material such as grain or seeds passing through second conveyor assembly 116. Intermediate section 135 includes a rounded lower end configured to sit within a curved recess or cavity formed at the upper end of lower conveyor section 134.

Intermediate section 135 is coupled to upper conveyor section 136 via folding assembly 152. Folding assembly 152 is configured to allow an intermediate housing flange of intermediate section 135 to abut against an upper conveyor housing flange of upper conveyor section 136 in an unfolded position, and further allows upper conveyor section 136 to pivot about a conveyor fold hinge pin relative to intermediate section 135 to position the upper conveyor section 136 in a folded position. For example, FIG. 3 shows the second conveyor assembly 116 in both a folded position and an unfolded position. Folding assembly 152 can include a conveyor fold actuator 604, such as a hydraulic cylinder, that is rotatably fixed at a first end to intermediate section 135 and rotatably fixed at a second end to upper conveyor section 136. In some embodiments, the first end can be fixed at a location other than intermediate section 135 and the second end can be fixed at a location other than upper conveyor section 136. For example, in some embodiments, the first end can be rotatably fixed on lower conveyor section 134. As another example, the second end can be rotatably fixed on intermediate section 135. Conveyor fold actuator 604 can, for example, be a hydraulic cylinder designed to facilitate folding and unfolding of upper conveyor section 136. Conveyor fold actuator 604 can be configured to lock upper conveyor section 136 in either an unfolded or folded state as desired.

Intermediate section 135 is coupled to lower conveyor section 134 via tilting assembly 150. Tilting assembly 150 is configured to allow upper conveyor section 136 and intermediate section 135 to tilt relative to lower conveyor section 134. Control logic may, in some embodiments, prevent the tilting operation to occur unless the upper conveyor section is locked in the unfolded or operating position. Tilting assembly 150 can, for example, include a conveyor tilt actuator 504, such as a hydraulic cylinder, that is rotatably fixed at a first end to frame 112 and rotatably fixed at a second end to intermediate section 135. In some embodiments, the first end can be fixed at a location other than frame 112 and the second end can be fixed at a location other than intermediate section 135. For example, in some embodiments, the first end can be rotatably fixed to lower conveyor section 134 or to intermediate section 135. As another example, the second end can be rotatably fixed to upper conveyor section 136.

Figure 5A:
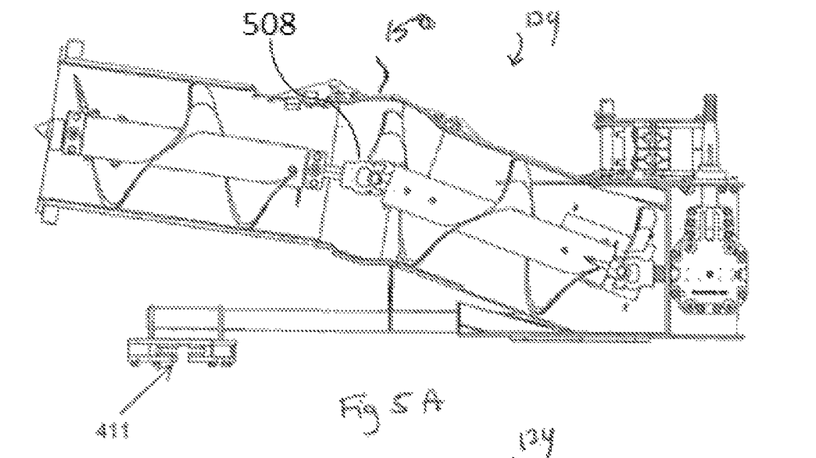
FIGS. 5A-5C are detail views of an embodiment of a tilting assembly for a grain cart with an upper auger section having adjustable forward reach.
Figure 5B:
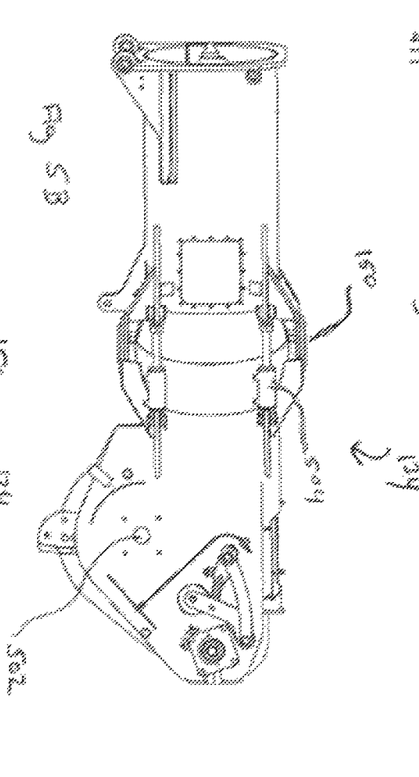
Figure 5C:
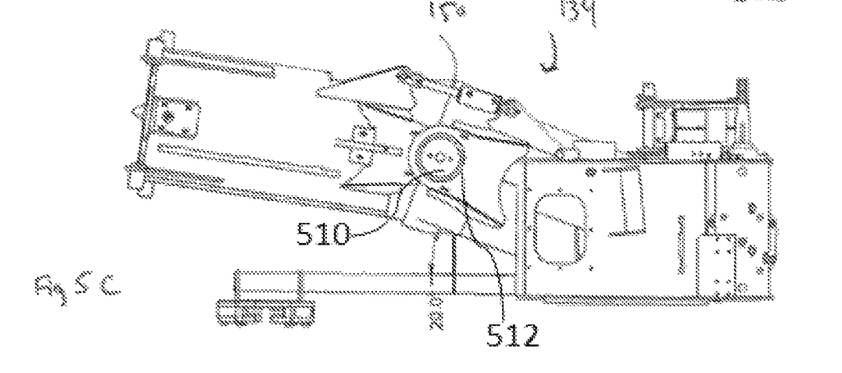
Figure 6A:
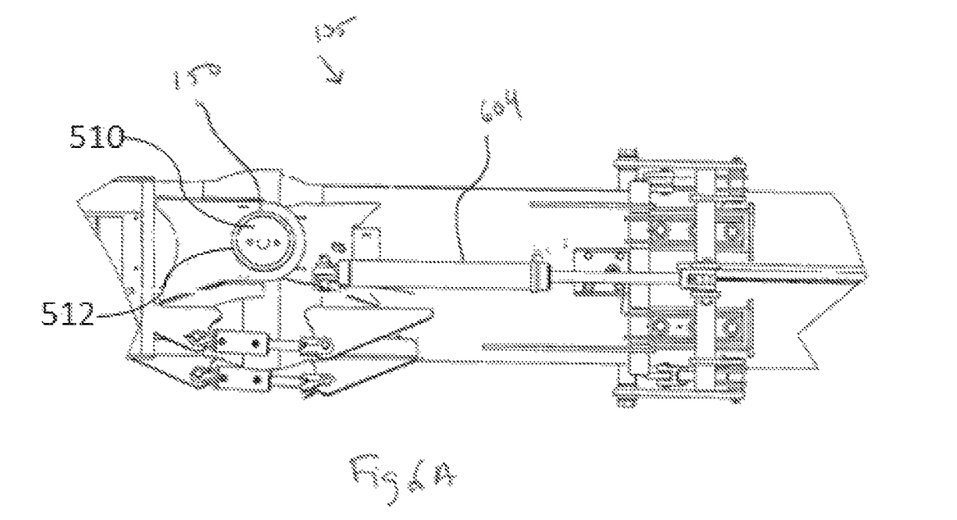
FIGS. 6A and 6B are detail views of an embodiment of a fold assembly for a grain cart with an upper auger section having adjustable forward reach.
Figure 6B:
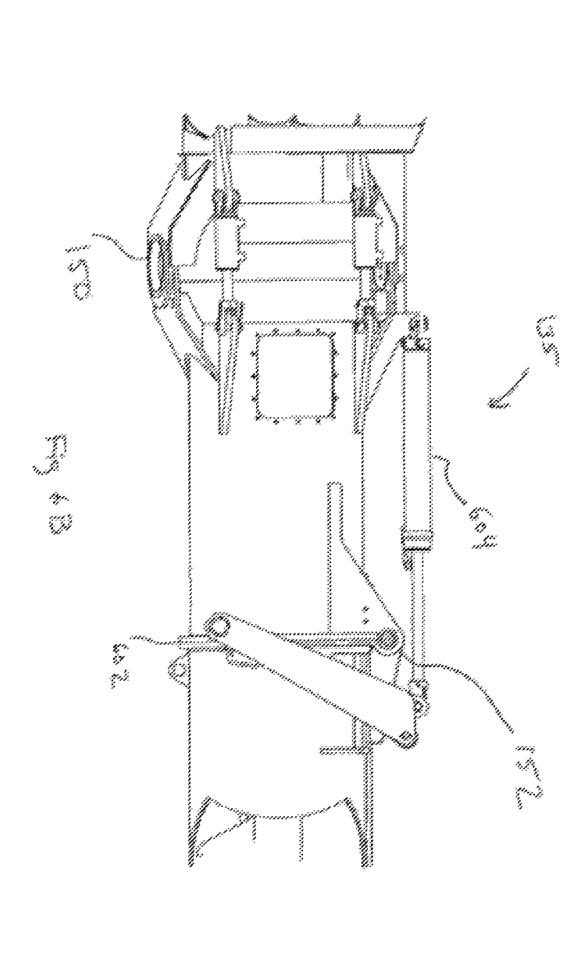

Conveyor tilt actuator 504 can, for example, be a hydraulic cylinder for facilitating tilting of intermediate section 135 and upper conveyor section 136. Conveyor tilt actuator 504 can be configured to lock upper conveyor section 136 in either a tilted or untilted (i.e., oriented in line with the lower conveyor housing) state as desired. As shown in FIGS. 5C and 6A, tilting assembly 150 can further include one or more conveyor tilt trunnions 510 extending from intermediate section 135 along a tilt axis. Conveyor tilt trunnions 510 can be designed such that they can be pivoted within a bearing assembly 512 secured to lower conveyor section 134 or another suitable part of cart 100, such as frame 112. In some embodiments, the bearing assembly 512 can be coupled to a bearing arm extending from lower conveyor section 134. In some embodiments, conveyor tilt trunnions 510 can be mounted on the lower conveyor section and a bearing assembly 512 can be mounted on the intermediate section.

Upper conveyor section 136 is coupled to lower conveyor section 134 via intermediate section 135. Upper conveyor section 136 includes a lower or bottom end configured to abut the intermediate section 135 in an unfolded operating position and an upper or top end with a discharge end 140, which can for example be in the form of a discharge spout. In the embodiment shown, the upper conveyor section 136 is a tubular member of cylindrical configuration, and an upper conveyor is movably (e.g., rotatably) disposed in the upper conveyor section such that a lower end of the upper conveyor is generally longitudinally aligned with folding joint 602. Upper conveyor section 136 is configured to convey material, such as grain, from the lower conveyor section 134 to discharge end 140. The upper conveyor of upper conveyor section 136 can be in the form of an auger. In some embodiments, the upper conveyor can be in the form of another suitable conveyor type for a grain cart, such as a suitable belt conveyor.

In accordance with some embodiments, sump 132 and lower conveyor section 134 are designed to stay fixed relative to bin 114 and frame 112. Upper conveyor section 136 is designed to pivot about a tilt axis, e.g., as defined by one or more shafts (e.g., trunnions). Such shafts can be secured by a bearing assembly, or bushings, to lower conveyor section 134. The mating surfaces between intermediate section 135 and lower conveyor section 134 can be arched, curved or rounded, to allow for a secure tilting motion. The figures provided herein depict a semi-spherical shape, but this shape could instead be a boxed section, and include for example appropriate arched, curved or rounded sides. These surfaces can include a seal of some manner to seal material from escaping second conveyor assembly 116. The tilt motion is moved by an actuator, which can for example be a linear actuator such as a hydraulic cylinder. One end of the actuator attached to the upper tilting portion, such as intermediate section 135, upper conveyor section 136, or another tilting portion of the second conveyor assembly 116, and the other end can be fixed to lower conveyor section 134, frame 112, or another non-tilting portion of cart 100.

In some embodiments, a control system with a computer processor and a memory storing computer code for execution by the processor can be coupled to one or more of the actuators and configured to only allow the second conveyor assembly 116 to be folded once it is in a predetermined tilt position. For example, the control system can be configured to only allow second conveyor assembly 116 to be folded when it is in an untilted position. In some embodiments, the control system can be configured to receive a command to fold second conveyor assembly 116 and determine whether second conveyor assembly 116 is in an acceptable tilt position to allow folding. If the control system determines that second conveyor assembly 116 is not in an acceptable tilt position for folding, the control system can provide an alert to an operator, which can, for example, provide an indication to the operator to adjust the second conveyor assembly to a suitable tilt position. Alternatively or additionally, control system can automatically move second conveyor assembly 116 such that it is in a suitable tilt position without requiring operator intervention. In some embodiments, a suitable tilt position for folding can include the highest tilted position. In some embodiments, a suitable tilt position for folding can include a zero tilt position. In some embodiments, the control system moves the adjustable forward reach to a rearward position (e.g., moves the tilt axis to the −20° position) prior to moving the upper conveyor section to the transport position, thereby allowing the design to minimize tongue length and to prevent the upper conveyor section from hitting a tractor cab towing the cart or bin 114.

While the invention has been particularly taught and described with reference to certain preferred embodiments, those versed in the art will appreciate that modifications in form and detail may be made without departing from the spirit and scope of the invention. For example, although second conveyor assembly 116 is illustrated as being a corner auger located at the front left corner of bin 114 of cart 100, second conveyor assembly 116 may alternatively be a corner auger located any corner of bin 114. Further, the invention is also applicable to carts having an auger that is not a corner auger.

By way of further example, while the second conveyor assembly 116 depicted in the figures is configured such that the upper conveyor section folds to a storage position in which the upper conveyor section extends across a front side of the bin in the storage position, it will be appreciated that the second conveyor assembly can be configured such that the upper conveyor section extends rearwardly along a side of the bin (e.g., a left side) in a storage position.

It is appreciated that cart 100 can include one or more features of the grain carts described in the above-mentioned related applications which have been incorporated by reference.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments. For example, while the conveyor is shown as an auger with flighting, it will be appreciated that other types of conveyors, such as belt conveyors, can be used. Also, while wheels are shown coupled to a frame in the various embodiments, it will be appreciated that track assemblies comprising a track or belt looped around a plurality of wheels may be used. All numbers in this description and figures indicating amounts, ratios of materials, physical properties of materials, and/or use are to be understood as modified by the word "about," except as otherwise explicitly indicated. Dimensions shown in the figures are designated in inches. The choice of materials for the parts described herein can be informed by the requirements of mechanical properties, temperature sensitivity, moldability properties, or any other factor apparent to a person having ordinary skill in the art. For example, one or more of the parts described herein (or a portion of one of the parts) can be made from suitable metals, alloys, plastics, and/or other suitable materials.

In the preceding specification, various preferred embodiments have been described with reference to the accompanying drawings. It will, however, be evident that various modifications and changes may be made thereto, and additional embodiments may be implemented, without departing from the broader scope of the invention. The specification and drawings are accordingly to be regarded in an illustrative rather than restrictive sense. It is also appreciated that the steps of the various methods described herein may be performed in any suitable order. These and other modifications of the present invention are intended to be within the scope of the appended claims.

For example, the second conveyor assembly may be configured such that the sections are positioned in the order lower conveyor section, tilt assembly, intermediate conveyor section, fold assembly, upper conveyor section. Alternatively, the second conveyor assembly may be configured such that the sections are positioned in the order lower conveyor section, fold assembly, intermediate conveyor section, tilt assembly, upper conveyor section. In this alternative embodiment, the intermediate and upper conveyor sections fold relative to the lower conveyor section, and the upper conveyor section tilts relative to the lower and intermediate conveyor sections.

What is claimed is:

1. A cart for transporting and conveying agricultural materials comprising:
  a frame;
  a set of wheels or tracks coupled with said frame;
  a hitch assembly coupled with said frame to allow said cart to be towed on said wheels or tracks behind a tow vehicle;
  a hopper defined by a plurality of walls supported by said frame and having a hopper opening to receive agricultural material and a discharge opening for discharging agricultural material;
  a conveyor assembly coupled to the hopper, said conveyor assembly including an inlet in communication with said discharge opening to receive agricultural material therefrom and an outlet to discharge agricultural material, wherein said conveyor assembly includes a lower conveyor section and an upper conveyor section;
  said lower conveyor section including a lower conveyor housing and a lower conveyor extending within said lower conveyor housing and said upper conveyor section including an upper conveyor housing and an upper conveyor extending within said upper conveyor housing; and
  a tilting assembly coupled to an end of said lower conveyor housing;
  wherein said upper conveyor section is pivotable about a second tilt axis located between said lower and upper conveyor sections and positioned at an acute angle from vertical; and
  wherein said tilting assembly is configured to pivot said upper conveyor section about the second tilt axis between a first operating position in which a longitudinal axis of said upper conveyor section is generally collinear with a longitudinal axis of said lower conveyor section and a second operating position in which said longitudinal axis of said upper conveyor section is angled relative to said longitudinal axis of said lower conveyor section.

2. The cart of claim 1, wherein said acute angle ranges from about 5° to about 40°.

3. The cart of claim 1, wherein said conveyor assembly is configured to pivot about a first tilt axis that is generally horizontal.

4. The cart of claim 3, wherein said first tilt axis is parallel to a longitudinal axis of the frame.

5. The cart of claim 3, wherein said upper conveyor is connected to said lower conveyor via a universal joint.

6. The cart of claim 5, wherein said tilting assembly further includes at least one trunnion extending from one of the upper and lower conveyor housings and at least one bearing assembly on the other one of the upper and lower conveyor housings configured to receive the at least one trunnion.

7. The cart of claim 6, wherein said tilting assembly further includes a linear actuator having one end connected to said lower conveyor section and another end connected to said upper conveyor section.

8. The cart of claim 3, wherein said tilting assembly is configured to tilt the upper conveyor section up to 20° in a forward direction or a rearward direction relative to the first operating position.

9. The cart of claim 3, wherein said tilting assembly is configured to be controlled by a control system.

10. The cart of claim 1, wherein said second tilt axis is oriented to allow said upper conveyor section to pivot forward and backward relative to the frame.

11. The cart of claim 1, wherein said conveyor assembly includes a first portion having a first set of helical flights of first diameter and first pitch and a second portion having a second set of helical flights of second diameter and second pitch, wherein said first diameter is larger than said second diameter, and wherein said first pitch is larger than said second pitch, and wherein said first portion is in one of the lower conveyor section and the upper conveyor section and said second portion is in one of the lower conveyor section and the upper conveyor section.

12. The cart of claim 1, wherein said longitudinal axis of said upper conveyor section extends upwardly at a first acute angle relative to a first plane generally perpendicular to a longitudinal axis of said hopper in said first operating position and extends away from the hopper at a second acute angle relative to said first plane in said second operating position.

13. The cart of claim 1, wherein said conveyor assembly further includes an intermediate section, said intermediate conveyor section including an intermediate conveyor housing and an intermediate conveyor extending within said intermediate conveyor housing, and said cart further comprising a folding assembly coupled to an end of said intermediate conveyor housing and having a fold axis, said folding assembly configured to pivot said upper conveyor section about said fold axis between a stored position and an operating position.

14. A cart for transporting and conveying agricultural materials comprising:
a frame;
a set of wheels or tracks coupled with said frame;
a hitch assembly coupled with said frame to allow said cart to be towed on said wheels or tracks behind a tow vehicle;
a hopper defined by a plurality of walls supported by said frame and having a hopper opening to receive agricultural material and a discharge opening for discharging agricultural material, said plurality of walls including a front wall;
a first conveyor assembly including a conveyor disposed in said hopper and operable to move agricultural material from said hopper towards said discharge opening;
a second conveyor assembly disposed forwardly of said front wall, said second conveyor assembly including an inlet in communication with said discharge opening to receive agricultural material therefrom and an outlet to discharge agricultural material, wherein said second conveyor assembly includes a lower conveyor section, an upper conveyor section, and an intermediate conveyor section;
said lower conveyor section including a lower conveyor housing and a lower conveyor extending within said lower conveyor housing, said intermediate conveyor section including an intermediate conveyor housing and an intermediate conveyor extending within said intermediate conveyor housing, and said upper conveyor section including an upper conveyor housing and an upper conveyor extending within said upper conveyor housing;
a folding assembly coupled to an end of said intermediate conveyor housing and comprising a hinge pin that defines a fold axis, said folding assembly configured to pivot said upper conveyor section about said fold axis between a stored position and an operating position; and
a tilting assembly coupled to an end of said intermediate conveyor housing and having a tilt axis, said tilting assembly configured to pivot the upper conveyor section about said tilt axis when said upper conveyor section is in said operating position.

15. The cart of claim 14, wherein said fold axis is oriented generally horizontally and parallel to a longitudinal axis of said hopper to allow said upper conveyor section, when the upper conveyor section is in a most rearward operating position, to fold across a front of said hopper.

16. The cart of claim 14, wherein said intermediate conveyor section includes a first end adjacent said lower conveyor section and a second end adjacent said upper conveyor section, and wherein said fold axis is positioned at said second end of said intermediate conveyor section and a second tilt axis is positioned at said first end of said intermediate conveyor section.

17. The cart of claim 16, said intermediate conveyor having a first end connected to said lower conveyor and having a second end configured to mate with said upper conveyor when said upper conveyor section is in said operating position and to be detached from said upper conveyor when said upper conveyor section is not in said operating position.

18. The cart of claim 14, wherein said intermediate conveyor is connected to said lower conveyor via a universal joint.

19. The cart of claim 18, wherein said tilting assembly includes at least one trunnion extending from one of the upper and intermediate conveyor housings and at least one bearing assembly on the other housing configured to receive the at least one trunnion.

20. The cart of claim 19, wherein said tilting assembly includes a linear actuator having one end connected to said lower conveyor section and another end connected to said intermediate conveyor section.

21. The cart of claim 20, wherein said folding assembly includes a linear actuator having one end connected to said upper conveyor section and another end connected to one of said lower conveyor section, said intermediate conveyor section, and said frame.

22. The cart of claim 14, wherein said tilting and folding assemblies are configured to be controlled by a control system.

23. The cart of claim 22, wherein said control system is configured to only move said upper conveyor section to said stored position when said upper conveyor section is in a predefined tilt position.

24. The cart of claim 23, wherein said control system is configured to automatically move said upper conveyor section to a suitable tilt position before moving said upper conveyor section to said stored position.

\* \* \* \* \*